United States Patent [19]
Grochowski

[11] Patent Number: 5,603,907
[45] Date of Patent: Feb. 18, 1997

[54] PROCESS AND DEVICE FOR TREATING FLUIDS BY MEANS OF A POURABLE SOLID BY THE COUNTERCURRENT METHOD

[76] Inventor: Horst Grochowski, Hafenstrabe 25 D-4200, Oberhausen, Germany

[21] Appl. No.: 449,286

[22] Filed: May 24, 1995

Related U.S. Application Data

[63] Continuation of Ser. No. 920,481, filed as PCT/EP91/00275, Feb. 13, 1991, published as WO91/12069, Aug. 22, 1991, abandoned.

[30] Foreign Application Priority Data

Feb. 16, 1990 [DE] Germany .................... 40 04 911/6

[51] Int. Cl.[6] .................................................. B01D 47/00
[52] U.S. Cl. .................. 423/210; 423/235; 423/239.1; 423/240 S; 423/244.01; 422/196; 422/213
[58] Field of Search .................... 422/177, 188, 422/189, 190, 196, 213, 223; 423/210, 240 S, 244.01, 239.1, 235

[56] References Cited

U.S. PATENT DOCUMENTS

| | | | |
|---|---|---|---|
| 4,508,544 | 4/1985 | Moss | 423/244.01 |
| 4,668,489 | 5/1987 | Alexander et al. | 423/210 |
| 4,786,484 | 11/1988 | Nelson | 423/239.1 |
| 4,789,528 | 12/1988 | Owen et al. | 422/223 |
| 5,344,616 | 9/1994 | Bruggerdick | 422/177 |

FOREIGN PATENT DOCUMENTS

| | | |
|---|---|---|
| 3228984 | 11/1983 | Germany. |
| 3305585 | 8/1984 | Germany. |
| 3406413 | 8/1985 | Germany. |
| 3528222 | 2/1987 | Germany. |
| 3732567 | 11/1988 | Germany. |
| 3916325 | 11/1990 | Germany. |

OTHER PUBLICATIONS

International Search Report WO 91/12069 No Date.

*Primary Examiner*—Gary P. Straub
*Assistant Examiner*—Stuart L. Hendrickson
*Attorney, Agent, or Firm*—Tarolli, Sundheim, Covell, Tummino & Szabo

[57] ABSTRACT

A process and device for the treatment of fluid, such as flue gas. A moving bed reactor has several reaction chambers. The reaction chambers are located in parallel flow locations. A solid bulk material is located in the reaction chambers. The fluid flows through the reaction chambers in parallel, from bottom to top of each reaction chamber. As the fluid flows through the reaction chambers, the fluid interacts with the bulk material to alter the fluid. Specifically, the bulk material absorbs and/or acts as a catalyst to remove impurities from the fluid. Flow through each of the reaction chambers can be interrupted without interruption of flow through the other reaction chambers. Some of the bulk material in each reaction chamber can be removed, as a layer, from the bottom and a replacement amount can be added, as a layer to the top.

9 Claims, 2 Drawing Sheets

PROCESS AND DEVICE FOR TREATING FLUIDS BY MEANS OF A POURABLE SOLID BY THE COUNTERCURRENT METHOD

This is a continuation of application Ser. No. 07/920,481, filed as PCT/EP91/00275 on Feb. 13, 1991 published as WO91/12069 on Aug. 22, 1991, now abandoned.

BACKGROUND OF THE INVENTION

The invention pertains to a process and a device for the treatment and in particular the cleaning of fluids, especially flue gases and so forth, whereby the process is preferably executed according to the countercurrent method with the aid of a pourable solid that is present in form of a bulk material. At least one bulk material travels from the top towards the bottom through at least one reaction chamber, and at least one fluid flows from the bottom towards the top through the bulk material layer within the reaction chamber. The process is preferably executed with the aid of a flow-past base in order to distribute the fluid over the cross section of the reaction chamber and to let the bulk material penetrate towards the bottom. In a known process for the cleaning of flue gases, the flue gas is usually conveyed through two, preferably even three, cleaning stages, whereby an adsorptive and/or catalytically effective bulk material is used in the last two cleaning stages.

For the cleaning of flue gases it is known to remove impurities such as HCl and/or $SO_x$ and/or heavy metals such as Hg as completely as possible from the flue gas with the aid of a first bulk material, in particular hearth furnace coke, after a so-called wet cleaning process is executed. Nitrogen oxide ($NO_x$) is removed from the previously cleaned flue gas in a subsequent cleaning stage by activated coke or activated charcoal consisting of glance coal. This process is executed by introduction of ammonia ($NH_3$) as reactant. $H_2O$ and $N_2$ are formed during this reaction. This two-stage cleaning process with only one bulk material is very demanding but is generally considered necessary because of the complex reactions of the components involved.

While the exhausted hearth furnace coke must be regularly removed, regenerated, incinerated or disposed, the last cleaning stage (denitration) can usually be operated like a fixed bed. Although this stage pertains to a catalytic reaction, it was established that an occasional exchange of the bulk material is necessary.

Next to the numerous reaction possibilities of the components involved, the presence of fine-particle impurities such as dust and so forth creates substantial problems during the operation of known bulk material reactors.

The problem of zones with reduced bulk material exchange in the reaction chamber exists in this known flue gas cleaning process. This problem primarily occurs in fluidized bed reactors through which the fluid flows in a transverse manner and in which louver-like fluid intake and fluid outlet walls are provided. The zones of poor bulk material exchange lie in the area of the louvers. Conglutinations, cakings and similar agglomerations of the bulk materials can occur in the zones of poor bulk material exchange inside the reaction chamber, which means that these agglomerations consistently increase the pressure loss in the bulk material layer over time. However, the problem of zones with poor bulk material exchange inside the reaction chamber can generally be controlled. A fluidized bed reactor with a special flow-past base that operates according to the countercurrent method (World Patent 8808746) was suggested for this purpose.

Even if the problem of zones with poor bulk material exchange within the reaction chamber is solved—whether it be by means of reaction chambers through which the liquid flows in a transverse manner or reaction chambers that are operated according to the countercurrent method—a further problem presents substantial difficulties during the operation of the bulk material reactor: a "swelling" of the bulk material particles can occur under certain conditions. The simultaneous presence of nitrogen oxides, ammonia and "acidic" inorganic compounds such as $SO_2$, $SO_3$, HCl, HF or similar compounds can under certain conditions lead to a "swelling" of the bulk material particles consisting of coal or coke (popcorn formation). The bulk material can reach twice its thickness, which means eight times its volume. This reaction is primarily observed in the zones where the liquid enters into the bulk material layer. This "popcorn" not only stresses the reactor but also leads to problems during the removal of the swollen bulk material particles since this "popcorn" is mechanically very unstable and thus easily crumbles during removal.

SUMMARY OF THE INVENTION

Originating from these facts, the invention is based on the objective of improving a process and a device of the initially mentioned type while avoiding the aforementioned disadvantages. It is in particular desired to make the process as undemanding as possible and to control the problems created by gases that contain dust and/or by the swelling of the bulk material particles (popcorn formation).

In regard to the process, this objective is attained by the present invention, in which the countercurrent method is applied. In the present invention a bulk material travels from the top to the bottom through at least one reaction chamber as the bulk material layer and that at least one fluid flows from the bottom towards the top in the reaction chamber through the bulk material layer; a flow-past base is preferably utilized for this process which distributes the fluid over the cross section of the reaction chamber and allows the more or less exhausted bulk material to penetrate towards the bottom so that it can be removed below the flow-past base.

The invention provides that the active treatment portion of the bulk material layer is neither limited in regard to its treatment activity or exhaustion activity nor adversely affected by fluctuations and/or increases of the pressure loss of the fluid within the bulk material layer and that the efficiency of the fluid treatment remains entirely intact under very unfavorable starting conditions, even with high quantities of particles in the fluid to be treated and/or during treatment conditions in which caking of the bulk material on parts of the reaction chambers, agglomerations of bulk material particles and/or swelling of the bulk material particles occur or can occur. The invention furthermore provides the possibility to realize comparatively high velocities of the flow of fluid in the bulk material layer. "Popcorn" formation only occurs at the gas intakes where it can—and will—be directly removed so that it does not remain in the layer for an extended period of time.

An entirely continuous fluid treatment is guaranteed if several reaction chambers are operated parallel to each other according to the invention, if the bulk material removal and the bulk material introduction from/into the bulk material layers is chronologically offset, in particular entirely successive, from reaction chamber to reaction chamber, and if the concerned flow of fluid is distributed to the remaining reaction chambers.

A short interruption of the fluid flow is not particularly damaging in certain instances since the phases of bulk material discharge and bulk material introduction can be kept very short—primarily with utilization of a flow-past base—for example, less than one minute once per day or week, and the quantity of bulk material to be removed is also maintained at a very low level, so it is basically possible in these instances to utilize only a single reaction chamber instead of several reaction chambers and to interrupt the flow of the fluid to be treated without diversion through other reaction chambers during the bulk material removal or partial bulk material removal. However, the measure according to which the fluid is distributed into parallel-operated reaction chambers provides the advantage of higher safety during operation and continuous operating conditions in the fluid to be treated.

If several impurities are to be removed from the flue gas with the aid of one single bulk material in one single cleaning stage executed after the dry countercurrent method according to a further example of the invention and if the removal and introduction of the bulk material are executed intermittently in essentially plane-parallel layers, the following advantages can be obtained: First, the effort for the construction and operation of a two-stage dry gas cleaning facility is reduced to a single stage. It is of course also possible to arrange a wet cleaning stage or a similar pre-cleaning stage before this single stage—as is the case with conventional two-stage dry cleaning processes. Second, all impurities in the gases to be treated are removed from the process in particularly concentrated form together with the exhausted or used bulk material. Third, particularly beneficial concentration profiles of the components to be removed are formed in the bulk material layer for the cleaning process, whereby a particularly high end exhaustion of the bulk material to be removed from the bulk material layer can be obtained.

While the cleaning of flue gas in, for example, waste incineration facilities thus far necessitated the removal of HCl, $SO_2$, heavy metals such as Hg, dioxins and/or similar elements in a first dry flue gas cleaning stage with the aid of hearth furnace coke and a catalytic transformation of $NO_x$ by addition of ammonia with activated glance coal coke as the bulk material in a second gas cleaning stage, the process according to the invention makes it possible not only to utilize one single bulk material in a single dry cleaning stage according to the countercurrent method, but also to provide a certain selectivity in regard to the type and characteristics of the bulk material. The process according to the invention makes it possible to exclusively utilize hearth furnace coke, exclusively activated glance coal coke, exclusively a zeolite, or in particular catalysts that consist of inorganic components and are effective at relatively low temperatures as the bulk material. In the aforementioned example of flue gas cleaning in a waste incineration facility, it is only necessary to apply somewhat more ammonia than in the instance of a two-stage dry cleaning process. It is basically also possible to operate a two-stage dry gas cleaning process, in particular according to the countercurrent method, with the process according to the claims outlined in the invention. In such instances the utilization of a special multistage reactor, as described in detail in the German A-39 16 325, is particularly advantageous.

If a special flow-past base as it is described in World Patent 8808746 is used according to a further example of the invention, only very minute quantities of bulk material must be removed and introduced from/into the bulk material layer. These flow-past bases control the problems of contamination of the bulk material particularly well since the most exhausted bulk material layer is already located in the removal area of the flow-past base. Although this flow-past base provides the possibility of reducing the bulk material layer by only a few millimeters in a single stage, for example, 1 to 100 mm, bulk material particles that are highly contaminated with dust, conglutinations and/or swelling and/or impurities can be removed from the bulk material layer without any problems in an essentially plane-parallel manner—namely even if the flow-past base has a large surface area. Other than that, the phases of bulk material removal and bulk material introduction with such a flow-past base can be maintained at a very short period, for example less than one minute per day or week, and the quantity of the bulk material to be removed can also be maintained at a very low level.

If the removal of bulk material from the bulk material layer in the reaction chamber is executed in at least two successively executed operation cycles according to a further example of the invention and the bulk materials removed in these successive operation cycles are separated from each other, a separate bulk material disposal for differently contaminated bulk materials can be realized, although the fluid treatment in the concerned bulk material layer is executed in one stage. This makes it possible to remove and dispose of concentrations of precipitated dust, concentrations of precipitated heavy metals, in particular mercury, and/or bulk material agglomerations formed in this zone and/or swollen bulk materials separately from the fluid introduction zones of the reaction chamber or the flow-past base, while the bulk materials removed in the subsequent operation cycle(s) are removed from the reaction chamber for subsequent regeneration processes or similar processes. It is of course also possible to remove layers of different contamination levels which separate from each other during the fluid treatment, for example at first a layer that is primarily contaminated with $SO_2$, and subsequently a layer that is primarily contaminated with HCl. This process makes it possible to interrupt the fluid supply to be treated only during a portion of the individual operation cycle.

In regard to a device for the execution of the process according to the invention, in which the device consists of at least one reaction chamber with intakes and outlets for the bulk material as well as at least one fluid intake opening and at least one fluid outlet opening, the objective is attained by an embodiment of the present invention.

The closing louver (locking element for the fluid) and its activation elements for the execution of the process are preferably constructed according to an embodiment of the present invention.

The aforementioned structural components or production steps, as well as the ones claimed and described in the following example according to the invention are not subject to any limitations in regard to their size, shape, material selection and technical concept or conditions of the process, so they can be applied without limitations for the selective criteria known in the corresponding application area.

BRIEF DESCRIPTION OF THE DRAWINGS

Further details, characteristics and advantages of the object of the invention result from the following description of the corresponding drawings in which preferred examples of a treatment process according to the invention in connection with a flue gas cleaning process for waste incineration facilities are illustrated.

The figures show.

DESCRIPTION OF THE PREFERRED EMBODIMENT

Figure 1:
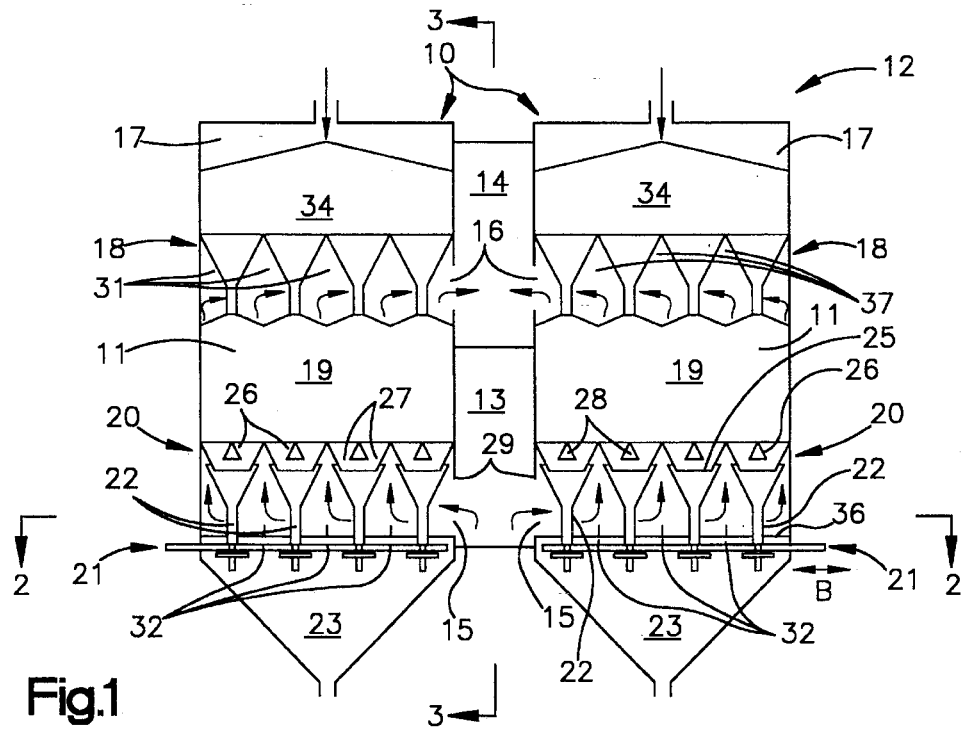
FIG. 1 a schematically illustrated vertical section (section along the line I—I in FIG. 2) of a fluidized bed reactor for the cleaning of flue gases in a waste incineration facility.
Figure 2:
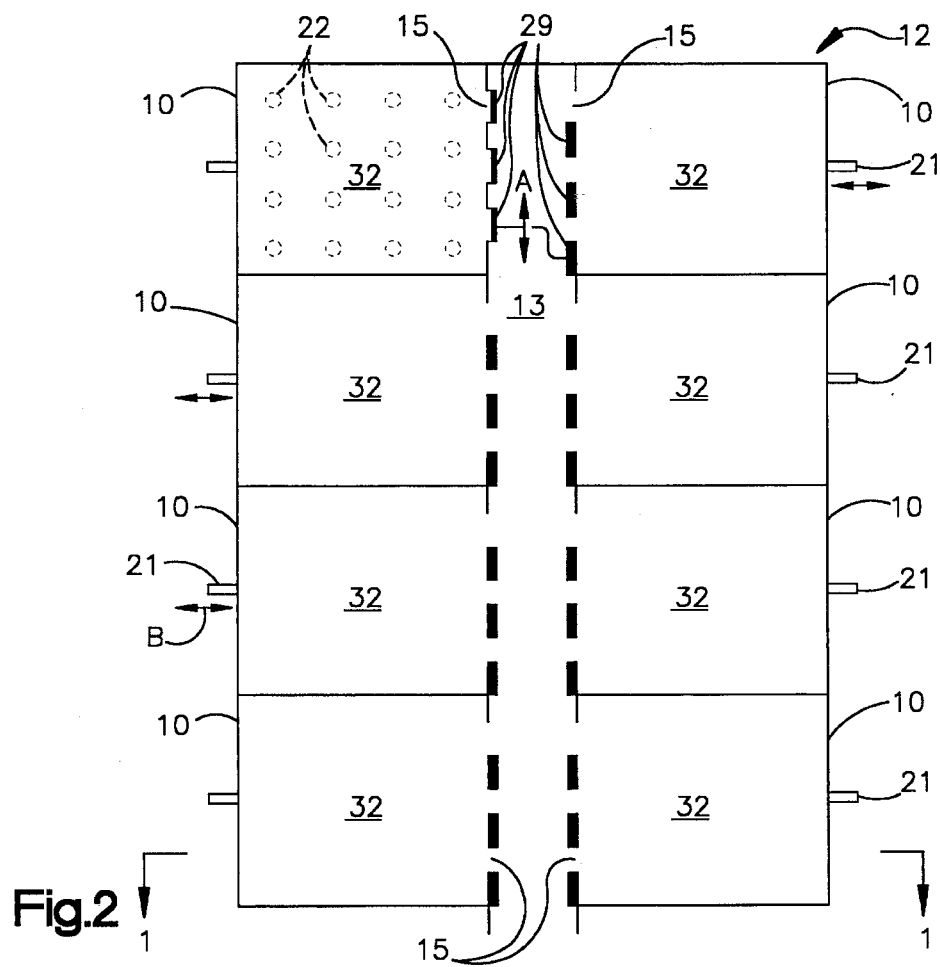
FIG. 2 a horizontal sectional view through the same fluidized bed reactor at the elevation of the line II—II in FIG. 1 or 3, whereby the bulk material removal pipes were omitted.
Figure 3:
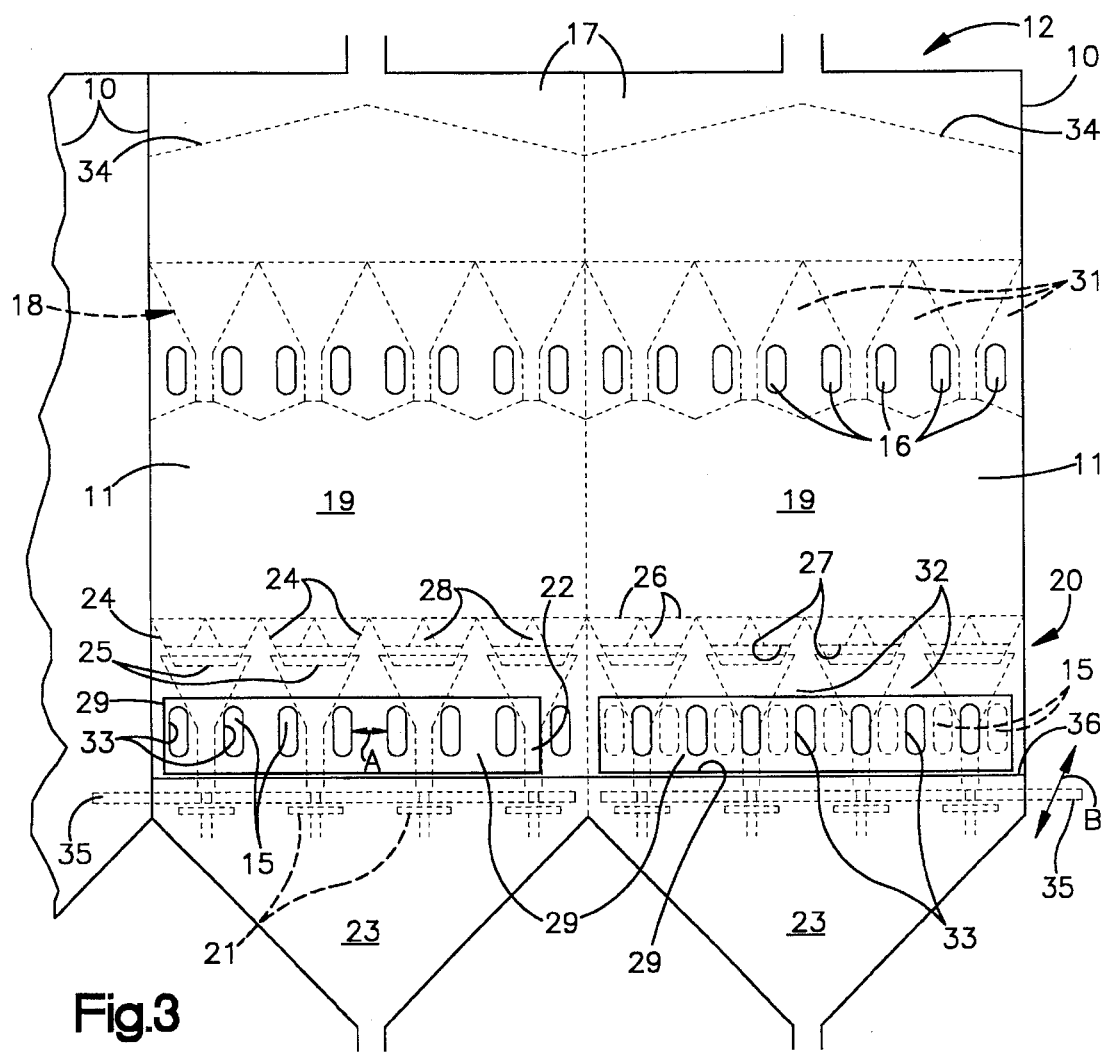
FIG. 3 a vertical sectional view through the same fluidized bed reactor in the direction of the arrows III—III in FIG. 1, whereby the components of the flow-past base are only illustrated schematically, and FIG. 4 an alternative example of a fluid intake arrangement to the flow-past base for a fluidized bed reactor.

FIGS. 1 to 3 schematically illustrate a fluidized bed reactor (12) consisting of altogether eight parallel-operating treatment reactors (10). Four treatment reactors each are arranged wall to wall in two rows that extend parallel to each other. These two rows are separated from each other by a lower gas intake channel (13) and a gas outlet channel (14) arranged directly above the same. Both channels serve as collection channels that are connected with all eight treatment rectors (10) by fluid intake openings (15) and fluid outlet openings (16). Instead of being arranged wall to wall next to each other, the treatment reactors can also be arranged separately from each other and provided with suitable intake and outlet lines for the fluid that are, for example, connected to a collective line.

Each individual treatment reactor has a bulk material supply bin (17), a bulk material distribution base (18) with an integrated fluid collection space (31) that is also connected with the fluid outlet openings (16), a bulk material layer (19) whose height is essentially constant over the cross section of the reactor, a flow-past base (20) with a fluid distribution space (32) that is connected with the fluid intake openings (15), a uniform removal device (21) for used bulk material, lockable bulk material removal pipes (22) as well as a collection bin (23) for the removed bulk material. Details of this fluidized bed reactor are not shown in order to provide a better overview and are also known from World Patent 8808746 as well as German Patent Application P 39 16 325.3. This particularly applies to the flow-past base (20) illustrated in detail in FIG. 3 with bulk material removal funnels or grooves (24) and with bulk material passage openings (25) that are covered by roof-shaped distribution elements (26) in such a way that at least the central and preferably the entire surface area of the bulk material passage openings (25) is covered like a roof. The distribution elements (26) together with the side walls of the bulk material removal funnels (24) form bulk material throughput openings (27). The distribution elements (26) protrude from the inner side of the funnel or the groove towards the interior of the funnel or the groove and are arranged around the periphery of the funnel or along the groove, whereby fluid throughput openings (28) are arranged in the funnel or groove side walls in such a way that the fluid penetrates into the bulk material layer (19) above the same at the lower edges of the roof-shaped distribution elements (26), which means in a defined manner in the plane and through the cross section formed by these bulk material throughput openings (27). The cross section surface of the funnels (24) available for the bulk material is widened below this throughput plane so that relatively large free bulk material surface areas are created below the roof-shaped distribution elements (26) and the free bulk material surface areas form free intake channels for the supplied fluid as well as relatively large contact surfaces for a first contact between the bulk material and the fluid flowing into same (World Patent 8808746).

The fluid intake openings (15) to each treatment reactor (10) can be connected or separated with/from the gas intake channel (13) by a slider (29) or flaps (30) with a correspondingly large and correspondingly arranged perforation. Each treatment reactor (10) is provided with an individual moveable closing louver (slider 29 or flap 30).

In the example according to FIG. 2, seven of the eight sliders (29) are in the "open" position, while the eighth slider (29) (on the top left in FIG. 2) is in the "closed" position, so the bulk material level can be lowered within the reaction chamber in the (last) treatment reactor whose fluid intake openings (15) are closed, which means that a plane-parallel layer of "used" bulk material can be removed and a corresponding quantity of bulk material can be introduced from the top. This manner of operation ensures that the bulk material layer (19) remains largely free of undesirable components such as dust, conglutinated and/or fractured bulk material particles and similar particles. While the fluid intake and/or outlet openings and the supply of fluid to be treated are preferably entirely "interrupted" during the entire bulk material removal from the concerned reaction chamber, according to the invention it is also possible or it can be sufficient to only partially interrupt the flow of fluid to be treated to the concerned reaction chamber, which means only to throttle the same, and/or to interrupt or throttle the same during a shorter period of time than the entire period required for the removal of the bulk material. The throttling has particularly beneficial effects in fluidized bed reactors with relatively few parallel-operated reaction chambers.

It was established that the temporary interruption of the fluid flow in one or a few of the eight treatment reactors does not adversely effect the result of the fluid treatment since the fluid velocity is chosen in such a way that the bulk material particles cannot be removed from the treatment reactor, even with a correspondingly increased flow velocity. It was furthermore established that the increase of the fluid velocity does not have any adverse influence on the intensity and the completeness of the fluid treatment if the preferred flow-past base described in connection with FIG. 3 is used.

With the aforementioned devices it is possible to remove the remaining HCl, $SO_x$, $NO_x$, heavy metals, in particular Hg, dioxins and similar elements from previously wet-cleaned flue gases in a waste incineration facility to an extent that conforms with the legal regulations—and even more thoroughly—by utilizing hearth furnace coke or activated glance coal coke.

FIG. 3, in which only two of the four (left) treatment reactors according to FIGS. 1 and 2 are illustrated in order to provide a better overview, the sliders (29) that are constructed separately from each other for each treatment reactor (10) and can be (separately) moved in the direction of the double arrow A are provided with perforations (33) that are identical to the fluid intake openings (15). The perforations (33) and fluid intake openings (15) have the same lateral distance to each other, whereby the closed surfaces are wider than the opened surfaces. This leads to the fact that a movement of the slider (29) by half the opening distance leads to a complete closing (as shown on the right in FIG. 3) or a complete opening (as shown on the left in FIG. 3).

FIG. 3 furthermore shows the cone of bulk material (34) in the bulk material supply bin (17).

Figure 4:
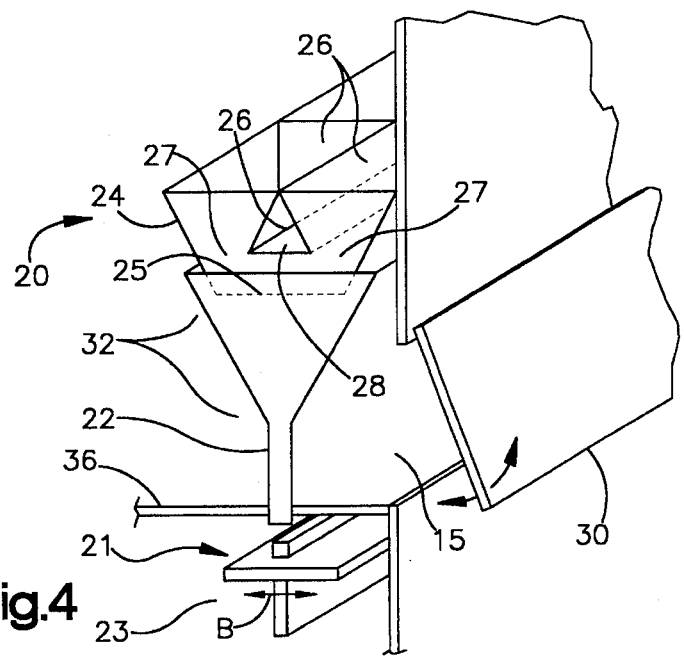

FIG. 3 furthermore shows that the removal devices (21) of each treatment reactor (10) known from World Patent 8808746 can be connected with each other by a connecting element (35), so a collective activation of these removal devices in direction of the arrow (B) (see FIGS. 1, 2 and 4) is possible.

The figures also show an intermediate base (36) through which the bulk material removal pipes (22) extend and which is arranged below the flow-past base (20). This causes the fluid distribution space (32) to be fluidally separated from the collection bin (23).

The flow of fluid can either be locked or throttled by sliders, flaps or similar elements on the gas intake and/or on the gas outlet side of the treatment reactors, all of which is not illustrated in detail in the figures.

List of Reference Numerals

10. Treatment reactors
11. Reaction chambers
12. Fluidized bed reactor
13. Gas intake channel
14. Gas outlet channel
15. Fluid intake openings
16. Fluid outlet openings
17. Bulk material supply bin
18. Bulk material distribution base
19. Bulk material layer
20. Flow-past base
21. Removal device
22. Bulk material removal pipes
23. Collection bin
24. Bulk material outlet funnel
25. Bulk material passage openings
26. Distribution elements
27. Bulk material throughput openings
28. Fluid throughput openings
29. Slider
30. Flap
31. Fluid collection space
32. Fluid distribution space
33. Perforations
34. Bulk material
35. Connecting element
36. Intermediate base

I claim:

1. In a process for the treatment of a fluid in a reactor which comprises one reaction chamber and at least two other reaction chambers parallel to each other and parallel to said one reaction chamber, by means of a pourable solid in the form of a fixed bulk material layer in each reaction chamber, wherein said fluid is simultaneously introduced into each said reaction chamber and caused to flow through each bulk material layer in each reaction chamber, the improvement comprising the steps of:

a) interrupting the flow of fluid into said one reaction chamber and then into each of the other of said reaction chambers in sequence for a brief period of time;

b) during the interruption of step a), in each reaction chamber, distributing the fluid flow which is interrupted into all other said reaction chambers increasing the flow rate of the fluid in said other reaction chambers for said brief period of time, said brief period of time being that necessary to avoid a significant change in operating conditions in said other reaction chambers;

c) removing a partial amount of bulk material from said one reaction chamber and then from each of the other of said reaction chambers in the same sequence with the interruption of fluid flow in said one reaction chamber and in each other of said reaction chambers and for said brief period of time, said removal causing the bulk material layers to move incrementally through said reaction chambers;

d) introducing additional bulk material into said one reaction chamber and then into each other of said reaction chambers in the same sequence with the removal of step c) and in amount equal to said partial amount of step c); and e) repeating steps a), b), c) and d) at a frequency by which said partial amount of bulk material in step c) is bulk material which is more or less exhausted.

2. The process according to claim 1 wherein the point of introduction of fluid into each reaction chamber is contiguous with the bottom of each reaction chamber and the removal of bulk material of step c) is from the bottom of each reaction chamber.

3. The process of claim 2 wherein the direction of flow of fluid in each reaction chamber is from the bottom to the top, and is countercurrent to the direction of incremental movement of each bulk material layer.

4. The process according to claim 3 wherein each reaction chamber comprises a base, said base comprising:

a) at least one funnel-shaped element for the flow of bulk material therein;

b) a first distributing element within said funnel-shaped element defining with said funnel-shaped element an annular through-put opening within the funnel-shaped element through which the bulk material flows:

c) a second distribution element around the periphery of the funnel-shaped element defining with the funnel-shaped element a fluid intake in communication with said annular through-put opening.

5. The process according to claim 4 wherein said fluid intake comprises an opening in a side wall of the funnel-shaped element.

6. The process according to claim 2 wherein said fluid is a flue gas containing dust particles and said bulk material is absorptive or catalytic, said bulk material layers being essentially planar and effective to remove or react components of said flue gas including dust particles in said layers.

7. The process according to claim 1 wherein said flue gas comprises at least one component selected from the group consisting of nitrogen oxide, sulfur oxide, hydrochloric acid, dioxins, and a heavy metal.

8. The process of claim 1 characterized by the removal in step c) of bulk material in two successive steps in which the bulk material removed in the first step is maintained separate from the bulk material removed in the second step.

9. In a process for the treatment of a fluid in a reactor which comprises a reaction chamber, a pourable solid in the form of a bulk material layer in said reaction chamber, and a fluid introducing end at one end of said reaction chamber whereby fluid is introduced into the reaction chamber at said one end and caused to flow into and through said bulk material layer resulting in the formation of exhausted bulk material at said one end, the improvement comprising the steps of:

a) incrementally removing said exhausted bulk material from said reaction chamber at said one end;

b) simultaneously with step a) incrementally introducing additional bulk material into said reaction chamber at an end opposite said one end;

steps a) and b) causing said bulk material layer to move incrementally in said reaction chamber in a direction which is countercurrent to the flow of fluid in said reaction chamber;

c) separating the incrementally removed bulk material of step a) into a first batch of first removed bulk material and into a second batch of second removed bulk material;

d) treating the first batch of first removed bulk material; and e) treating the second batch of second removed bulk material separately from the treatment of the first batch of first removed bulk material.

* * * * *